(12) United States Patent
Gastaldo et al.

(10) Patent No.: US 6,473,729 B1
(45) Date of Patent: Oct. 29, 2002

(54) WORD PHRASE TRANSLATION USING A PHRASE INDEX

(75) Inventors: Michel Gastaldo, Montbonnot (FR); Gregory Grefenstette, Gieres (FR)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/466,823

(22) Filed: Dec. 20, 1999

(51) Int. Cl.$^7$ ............................................... G06F 17/28
(52) U.S. Cl. ................................................. 704/4; 704/7
(58) Field of Search ................................. 704/2–7, 277, 704/10; 707/536, 100, 532; 434/156, 157

(56) References Cited

U.S. PATENT DOCUMENTS

| | | | | |
|---|---|---|---|---|
| 5,311,429 A | * | 5/1994 | Tominaga | 704/2 |
| 5,329,446 A | * | 7/1994 | Kugimiya et al. | 704/3 |
| 5,644,774 A | * | 7/1997 | Fukumochi et al. | 704/3 |
| 5,659,765 A | * | 8/1997 | Nll | 704/9 |
| 5,867,811 A | * | 2/1999 | O'Donoghue | 704/1 |
| 5,893,134 A | * | 4/1999 | O'Donoghue et al. | 704/536 |
| 5,983,171 A | * | 11/1999 | Yokoyama et al. | 704/10 |
| 6,098,034 A | * | 8/2000 | Razin et al. | 704/9 |
| 6,161,083 A | * | 12/2000 | Franz et al. | 704/4 |

FOREIGN PATENT DOCUMENTS

| | | | | |
|---|---|---|---|---|
| EP | 0 387 960 A1 | 9/1990 | | G06F/17/28 |
| EP | 0 887 748 A2 | 12/1998 | | G06F/17/28 |
| WO | WO 00/34890 | 6/2000 | | G06F/17/28 |

OTHER PUBLICATIONS

Makoto Nagao, "A Framework of a Mechanical Translation Between Japanese and English by Analogy Principle," Artificial and Human Intelligence, 1984.
Patent Abstracts of Japan, vol. 016, No. 175 (p–1344), 4–27–1992 & JP 04 017065 A, 1–21–1992, abstract.
Patent Abstracts of Japan, vol. 1997, No. 06, 6–30–97 & JP 09 050435 A, 2–18–1997, abstract.
Brian Harris, "Bi–Text, a new concept in translation theory," vol. 54, 1988, pp. 8–11, XP000747663, Baltimore, MD.

* cited by examiner

*Primary Examiner*—Patrick N. Edouard
(74) *Attorney, Agent, or Firm*—Oliff & Berridge, PLC (57) ABSTRACT

A system and method are provided for translating an input text from a natural source language to a natural target language. The system stores a database that contains a plurality of pairs of text fragments with each pair including a text fragment in the source language and a corresponding text fragment in the target language. Each text fragment contains at least one word phrase and represents a primary grammatical unit such as a sentence or a clause. For translating a word phrase, the database is queried using a phrase index of the database, where the phrase index indexes text fragments by word phrases. Word phrases are noun phrases or word phrases. Alternatively, word phrases are predicates involving at least one verb and one noun or adjective used as a noun. The system further comprises a phrase extractor for extracting a word phrase from a text fragment of an input text.

29 Claims, 7 Drawing Sheets

WORD PHRASE TRANSLATION USING A PHRASE INDEX

BACKGROUND OF THE INVENTION

1. Field of the Invention

The invention generally relates to translating expressions from one natural language into another natural language, and in particular assisting a translator to get the right translation for any phrase.

2. Description of the Related Art

Any translator is evaluated according to two criteria: translation speed and translation quality. One difficulty affecting both of these criteria is the appearance of a word or group of words which makes the translator hesitate. Finding the suitable translation may lead to a time-consuming manual search, with no guarantee of the result.

Presently, several techniques have been developed for assisting a translator. One of these techniques involves the use of contextual dictionary look-up. Contextual dictionaries allow for getting the translation of a word according to its context. This technique is strongly limited in the extent to which translations are possible, i.e. by looking up a contextual dictionary, the translator is provided with a low number of proposed translations only.

Further, multi-lingual terminology databases exist which are based on translations of pre-accepted terms. This technique is strongly restricted to the prestored set of terms, and the translator is not assisted in translating expressions which are not part of the set of pre-accepted terms.

A further technique is based on the use of translation memory which stores already translated sentences. When a sentence has to be translated, the system queries the database and automatically proposes a translation. However, this system requires matching complete sentences, even if the matching can be fuzzy, so that this technique is again strongly restricted in its applicability.

Another translation technique has been proposed by M. Nagao, "A Framework of a Mechanical Translation between Japanese and English by Analogy Principle", Artificial and Human Intelligence (A. Elithorn and R. Banerji, eds.), Elsevier Science Publishers, 1984, pgs. 173–180. This technique involves aligning and linguistically parsing sentences for machine translation. The parse trees from each pair of sentences are also aligned. One drawback of this technique is that such machine translation systems require performing an overall parse of the translated sentences. Another drawback is that subtrees are needed to be aligned, resulting in a considerably high computational overhead.

SUMMARY OF THE INVENTION

The present invention has been made in consideration of the above situation and has as its primary object to assist a translator to achieve an improved quality of the resulting document.

It is another object of the present invention to contribute to a controlled translation to prevent expensive manual search for unknown expressions, thereby providing functionality in addition to that of using translation memory and terminology databases.

It is still another object of the present invention to provide the translator with an easy-to-use, efficient and reliable tool which is capable of promptly replying to the translator's request for assistance.

A further object of the present invention is to be compatible with existing technology and software tools.

These and other objects of the present invention will become apparent hereinafter.

To achieve these objects, according to a first aspect, the invention provides a method for translating a word phrase from a first natural language to a second natural language. The word phrase is a group of two or more associated words. The method comprises the steps of inputting a text written in the first language; extracting a word phrase from said text; and querying a database for the extracted word phrase using a phrase index of said database. The phrase index indexes text fragments by word phrases. The text fragments represent a primary grammatical unit including at least one clause. The database contains pairs of text fragments, with each pair including a text fragment in the first language and a corresponding text fragment in the second language. A translation of said extracted phrase is then obtained based on one of the pairs of text fragments revealed during the step of querying the database.

According to a second aspect of the present invention, there is provided a computer-readable storage medium storing instructions for translating a word phrase from a first natural language to a second natural language by performing the steps according to the first aspect.

According to a third aspect of the present invention, there is provided a system for translating an input text from a natural source language to a natural target language. The system comprises storage means for storing a database containing a plurality of pairs of text fragments. The text fragments represent a primary grammatical unit including at least one clause. Each pair includes a text fragment in the source language and a corresponding text fragment in the target language. Each text fragment contains at least one word phrase. The word phrase is a group of two or more associated words. The system further comprises a phrase extractor for extracting a word phrase from a text fragment of said input text, and database retrieval means for retrieving, from said database, pairs of text fragments that contain the extracted word phrase, using a phrase index of database. The phrase index indexes text fragments by word phrases. The system furthermore comprises user interface means for allowing a user to select one of said retrieved pairs of text fragments to obtain a translation of the extracted word phrase.

According to a fourth aspect, the invention provides a method for generating a text fragment database for use in translating a word phrase from a first natural language into a second natural language. The word phrase is a group of two or more associated words. The method comprises the steps of inputting a first document containing a text written in the first language; inputting a second document containing said text written in the second language; aligning corresponding text fragments of the first and second documents; extracting word phrases from the text fragments of the first document; and generating index information on the extracted word phrases and the aligned text fragments holding the word phrases. The text fragments represent a primary grammatical unit including at least one clause.

According to another aspect of the present invention, in the methods and systems according to the first to fourth aspects, the word phrases preferably are noun phrases. Alternatively, the word phrases may also be verb phrases. In another alternative, the word phrases may be predicates involving at least one verb and one noun or adjective used as a noun.

According to still another aspect of the present invention, the primary grammatical units are sentences.

It is still another aspect of the present invention that, once pairs of text fragments have been retrieved from the database, these retrieved pairs of text fragments are presented to the translator. Alternatively, the translator is provided with proposed translations of the extracted word phrase, based on the retrieved pairs of text fragments. In either case, the translator approves a translation, and the approved translation is then used as translation of the extracted word phrase.

According to still another aspect of the invention, in the systems and methods according to the above aspects, the step of querying the database for the extracted phrase includes the step of querying the database for sub-phrases, i.e. for all word phrases partly matching the extracted phrase.

Finally, the present invention according to any of the above aspects, may involve the step of obtaining a translation by querying a terminology base in addition to the phrase-indexed text fragment database.

By using the approach of the present invention, the database is phrase-indexed. Extracted word phrases directly index whole text fragments. In preferred embodiments, the noun phrases are used to index a sentence database. The extracted noun phrases directly index whole sentences thereby leaving the recognition of the corresponding sub-units in the translated sentences to the translator. Therefore, no overall parse of the translated sentences is performed and no alignment of subtrees is necessary.

The invention is further advantageous in that it makes use of already translated material and presents to the translator, in the preferred embodiment, sentences containing the respective noun phrase both in the source and target language. By using a phrase-indexed sentence database, both translation speed and translation quality are improved.

BRIEF DESCRIPTION OF THE DRAWINGS

The accompanying drawings are incorporated into and form a part of the specification to illustrate several embodiments of the present invention. These drawings together with the description serve to explain the principles of the invention. The drawings are only for the purpose of illustrating preferred alternative examples of how the invention can be made and used and are not to be construed as limiting the invention to only the illustrated and described embodiments. Further features and advantages will become apparent from the following and more particular description of the various embodiments of the invention, as illustrated in the accompanying drawings, wherein.

DETAILED DESCRIPTION OF THE INVENTION

According to the invention, word phrases are used for indexing text fragments representing a primary grammatical unit including at least one clause.

Phrases are expressions consisting usually of but a few words, denoting a single idea or forming a separate part of a sentence. Specifically, a phrase is a group of two or more associated words, not containing a subject and predicate. Noun phrases are phrases involving either pronouns or nouns. Nouns are words used as the name of a thing, quality of action existing or conceived by the mind. Pronouns are words used as a substitute for a noun. Thus, noun phrases are e.g. "road test", "fuel pressure test operations", or "verb phrase". By contrast, verb phrases are phrases involving one or more verbs such as "broadened" or "having been fitted".

Distinguished from a phrase, a clause is a group of words containing a subject and predicate, that is, clauses are syntactic constructions forming part of a sentence or constituting a whole simple sentence. Sentences are grammatical units of one or more words, bearing minimal syntactical relation to the words that precede or follow it, i.e. comprising a minimum sense of completeness and unit. Sentences express a complete thought, whether a statement of fact, a question, a command, or an exclamation.

Thus, clauses and sentences can be defined as primary grammatical units. Whereas sentences may comprise clauses and phrases, and clauses may comprise phrases, phrases cannot comprise clauses or sentences. The preferred embodiment of the invention makes use of noun phrases to index sentences.

Figure 1:
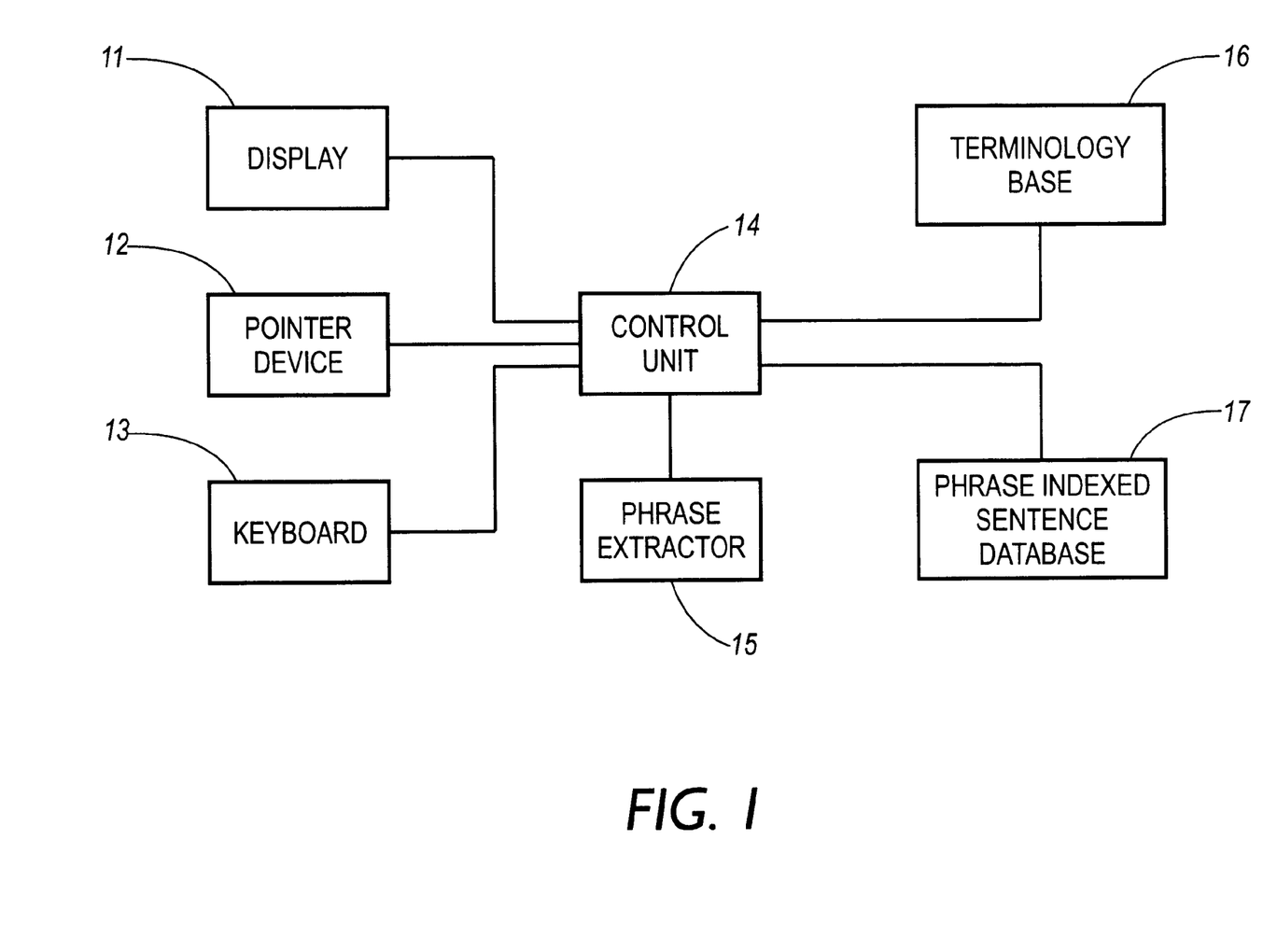
FIG. 1 illustrates a translation system according to the invention.

Referring now to the drawings and particularly to FIG. 1, the translation system according to a preferred embodiment of the invention comprises a control unit 14, which may be a computer of any kind such as a personal computer or a workstation, e.g. running a conventional operating system such as Windows NT or UNIX. The control unit 14 runs a software application which may be controlled by pointer device 12 or keyboard 13, using a display 11. The interface software may for instance be written in Visual Basic, and the resulting application can be an OLE server which can be integrated directly to any Visual Basic or C/C++ code. It will however be appreciated by those of ordinary skill in the art that many other kinds of implementations are also possible.

The application program running on control unit 14 has access to sentence database 17 which might be an Access or Oracle database and which has preferably been generated using a UNIX workstation. The size of the database depends on the field in which the system is used. Again, it will be appreciated that many other implementations are possible.

Sentence database 17 stores a plurality of sentences in English as the source language, and also stores to each English sentence the corresponding sentence in French as the target language. The sentence database 17 further includes a phrase index holding information to each noun phrase stored in any sentence of the database, indicating the sentences in which the respective noun phrase is to be found. The translation software running on control unit 14 further has access to phrase extractor 15, which extracts noun phrases from an input text using complex linguistic algorithms. The input text may come from any text source such as storage media, scanners, messages, speech recognition etc.

Figure 2:
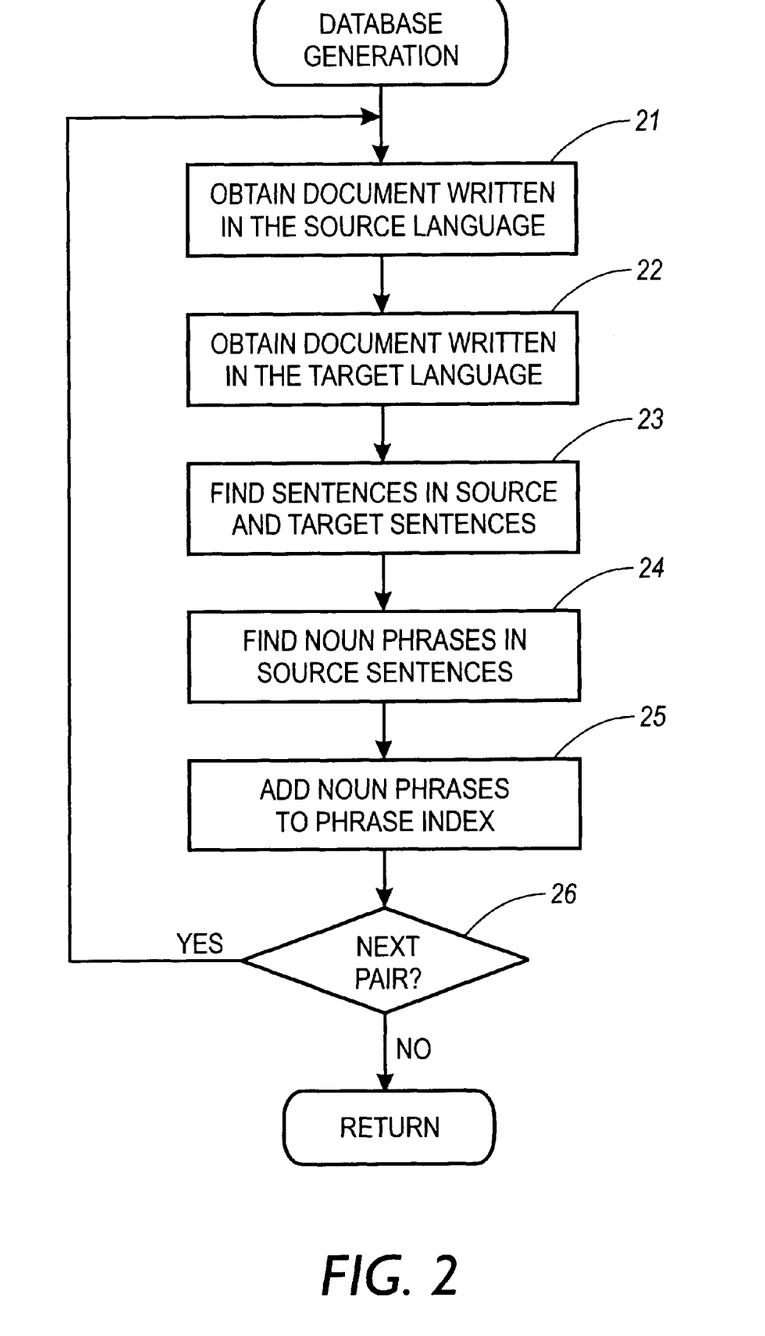
FIG. 2 is a flow chart illustrating the process of generating a phrase-indexed sentence database according to the invention.

Referring now to FIG. 2, which illustrates a flow chart of the process of generating the phrase-indexed sentence database 17, the system first obtains, in steps 21 and 22, a document written in the source language and a corresponding document written in the target language. Then, in step 23, in the pair of source and target documents the sentences are aligned. Aligning sentences means establishing a link between each source sentence and the corresponding target sentence. After the sentence have been aligned, noun phrases are extracted from each of the source sentences in step 24, and the extracted noun phrases are added to the phrase index of sentence database 17 together with the respective information concerning the sentence from which the noun phrase has been extracted. After the extracted noun phrases have been added to the phrase index in step 25, a decision is made in step 26 whether another pair of source/target documents is to be read in. If so, the process of generating the database returns to step 21 for obtaining the documents, aligning the sentences and extracting and storing the noun phrases. By repeating steps 21 to 26 for a set of translated document pairs, a comprehensive database will be built storing a high number of encountered noun phrases with the sentences holding them.

While the process in FIG. 2 has been described in the context of generating the phrase-indexed sentence database 17, it will be appreciated by those skilled in the art that the illustrated process also can be used at any time to enrich an existing database by storing sentences and noun phrases of new document pairs. Further, it will be apparent to those of ordinary skill in the art that the process of updating and generating the database has been described in the context of documents but that it may likewise be performed on the basis of document parts.

In another preferred embodiments of the present invention, only those documents are used for building the database which lie in one and the same field, i.e. car maintenance documents. By this measure the number of possible translations of each noun phrase is reduced so that, if the database is large enough, most of the noun phrases will be indexed and a translation will be available for almost all the requests.

Figure 3:
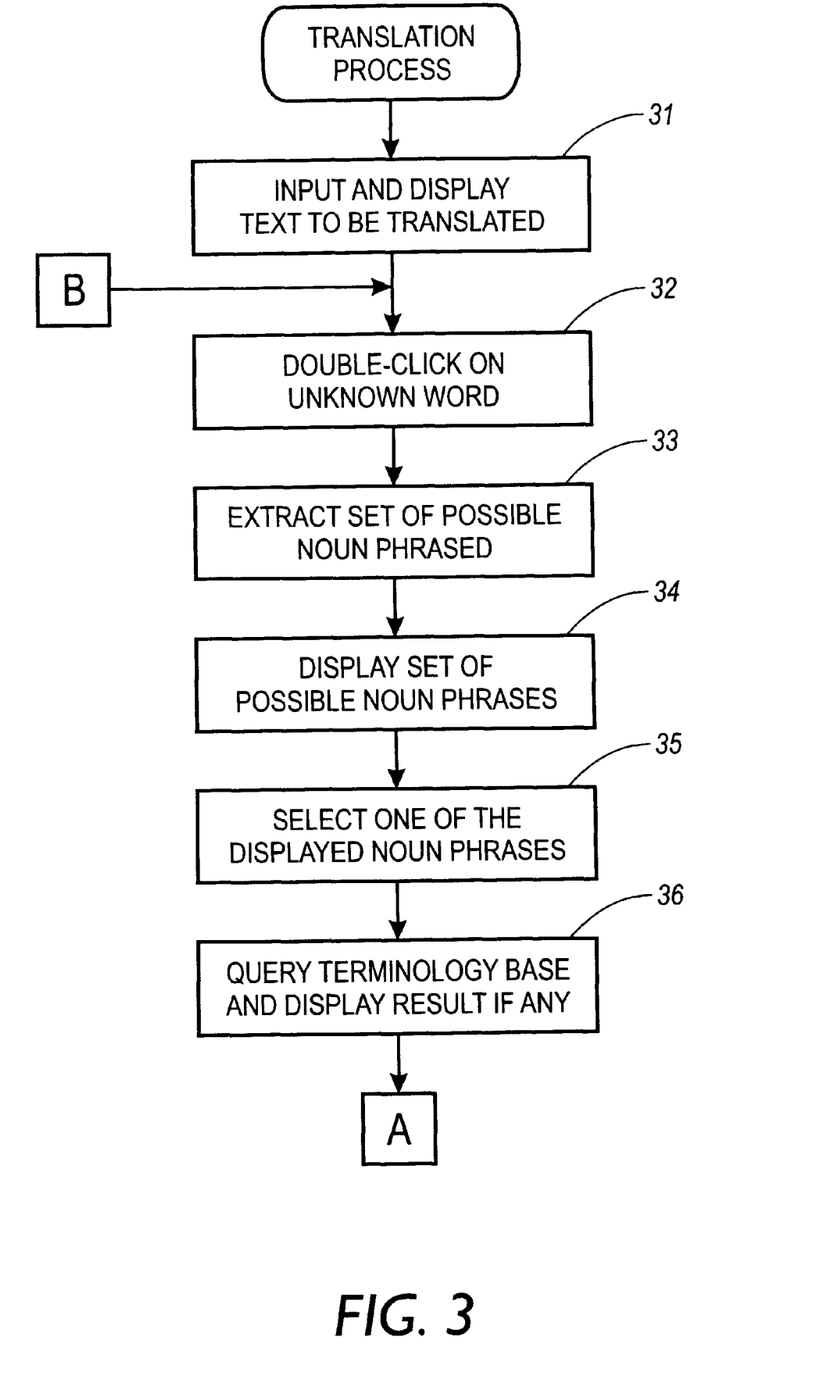
FIGS. 3 and 4 are flow charts illustrating the translation process according to the invention.
Figure 4:
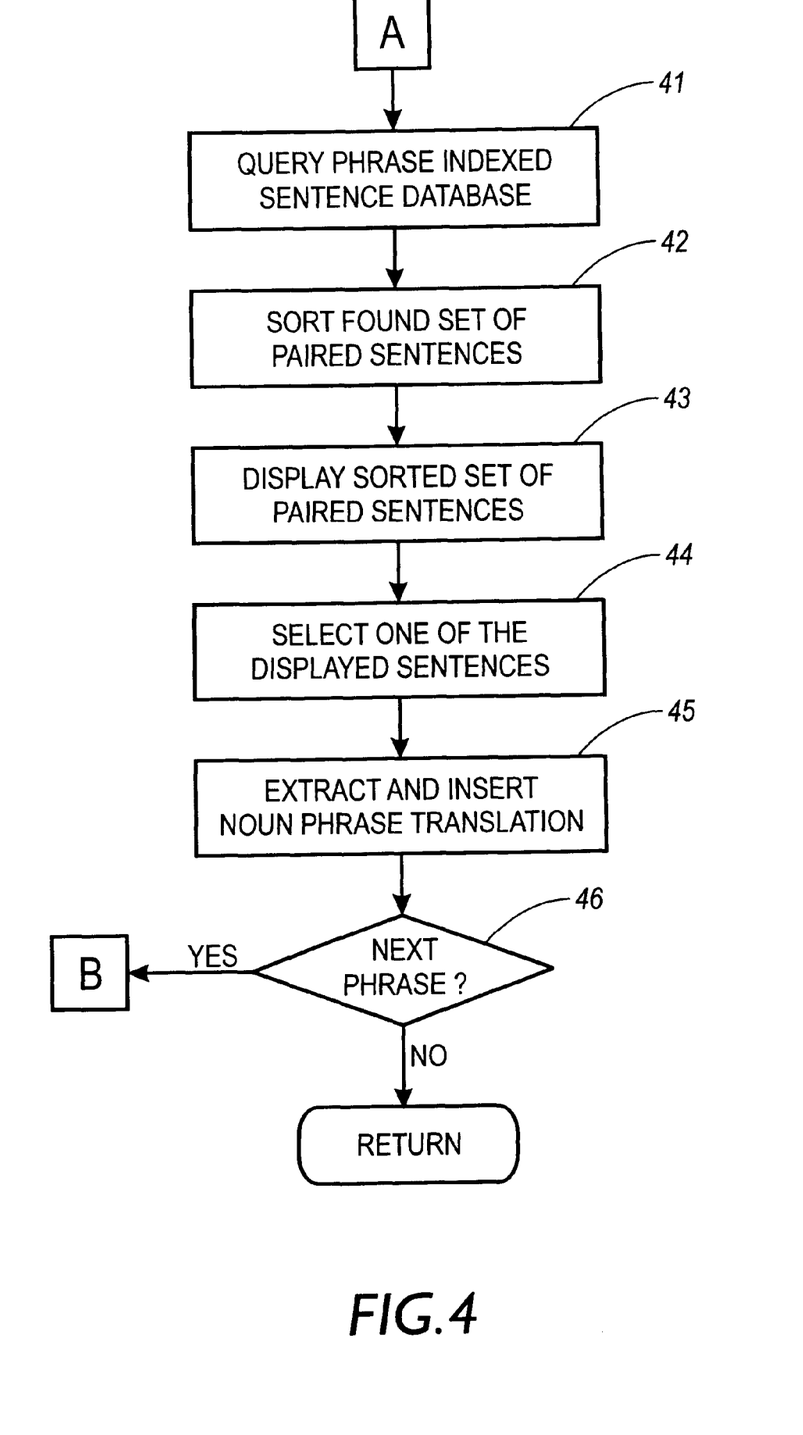

Turning now to FIGS. 3 and 4, which illustrate a flow chart of the translation process, the user inputs the text to be translated in step 31. The text is then displayed so that the user can select an unknown word or group of words, e.g. by double-clicking on the word. Once a word has been selected in step 32, phrase extractor 15 extracts in step 33 all the possible noun phrases relating to the selected word. The set of possible noun phrases is then displayed in step 34, and one of the displayed noun phrases is selected, in step 35, either automatically or by user request. By default, the longest of the extracted noun phrases is selected, with no need of user selection. This automated selection may also be performed depending on whether the extracted noun phrases exist in the database. In this case, the longest (sub) noun phrase existing in the database is selected. In any case, selection may be performed or changed by the user.

Figure 5:
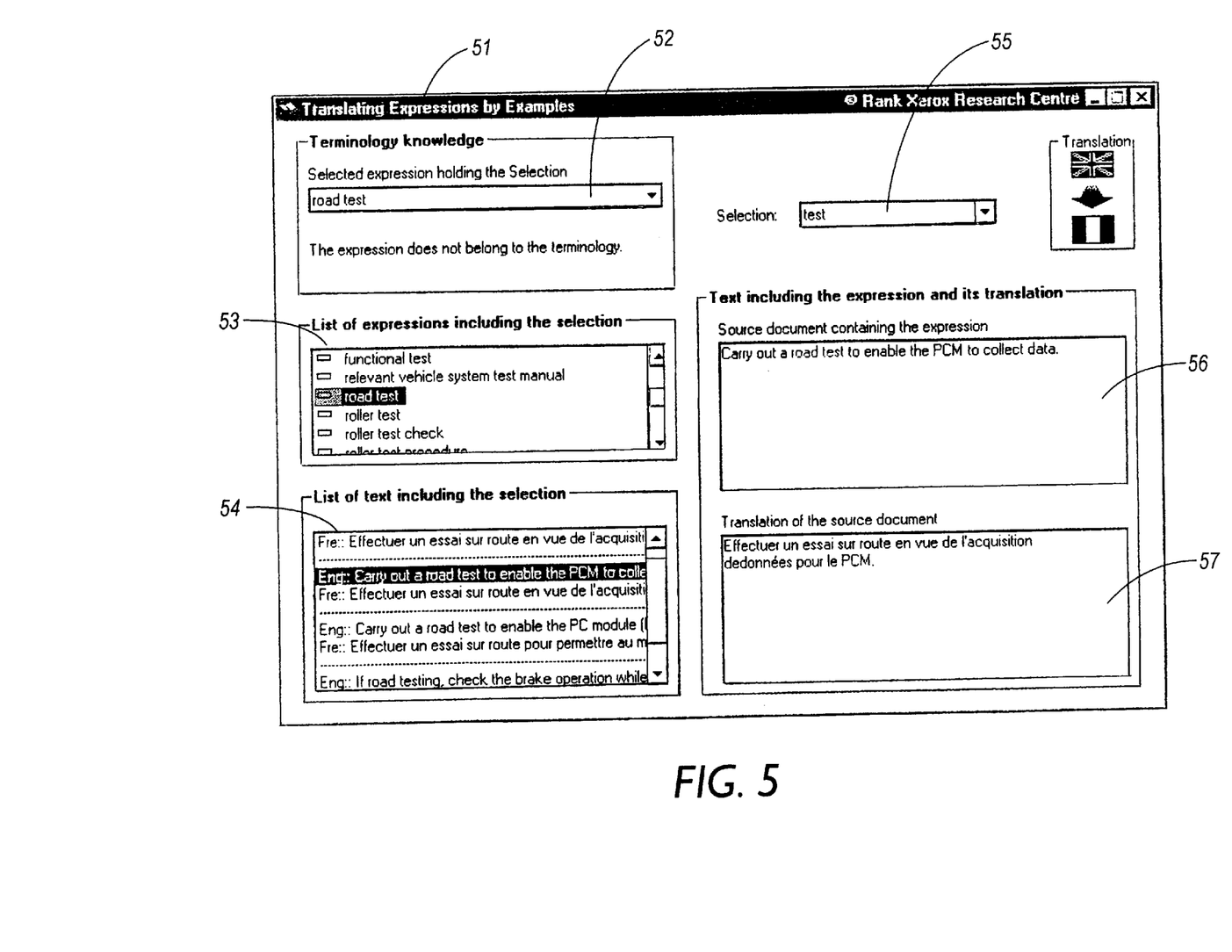
FIG. 5 illustrates a first embodiment of a user interface according to the invention.

FIG. 5 shows an example of how to present the mentioned information to the user. In a windowing operation system, the control unit 14 displays a window 51 in which a number of fields is shown. The word which has been selected by double-clicking in step 32 is displayed in field 55. In field 53 the set of possible noun phrases which has been extracted in step 33 is displayed. From this set of noun phrases the user has selected, in the example of FIG. 5, the noun phrase "road test", which is then shown in field 52.

Once the user has selected one of the possible noun phrases, control unit 14 queries the phrase-indexed sentence database 17 in step 41. Since all the sentences in the phrase-indexed sentence database 17 are directly indexed by noun phrases, the system is able to retrieve all pairs of sentences indexed by the selected noun phrase without any substantive delay. The system then sorts in step 42 the retrieved pairs of sentences according to their relatedness to the original sentence. For this purpose all the noun phrases in the original sentence of the input text and those in the retrieved sentence are compared and the relatedness then depends on the number of common noun phrases. Thus, the system is able to present to the user in step 43 all the pairs of sentences with those sentences first which are closest to the one to be translated. An example of a displayed sorted set of paired sentences is depicted in FIG. 5 as field 54.

In step 44 of FIG. 4 the user selects one of the displayed sentences of field 54 which is then copied to fields 56 and 57 to allow the user to more intensively study the proposed translation. Once the user has decided that the selected pair of translated sentences should be used for translating the selected word of the input test, phrase extractor 15 extracts in step 45 from the selected sentence pair the noun phrase translation and inserts the translated noun phrase automatically into the translation of the input text.

In step 46 the translator decides whether a further noun phrase needs to be translated. If so, the process returns to step 32 and the user selects another unknown word.

Figure 6:
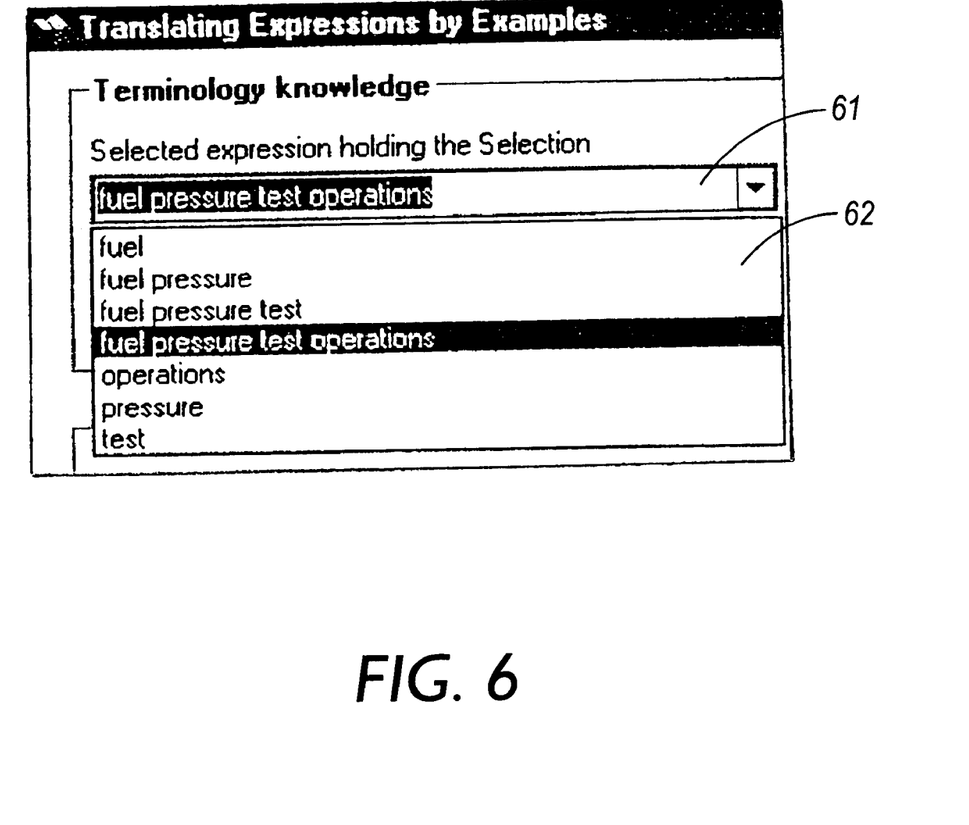
FIG. 6 illustrates the use of sub-phrases.

Turning now to FIG. 6, which illustrates the operation on field 52 according to a preferred embodiment, the capability of the system according to the invention to operate on noun sub-phrases is described. In case the user selects from field 53 in step 35 a noun phrase which has no entry in the phrase index of sentence database 17, the system either automatically looks for partial matching noun phrases, or presents to the user in fields 61 and 62 a list of sub-phrases from which the user may select an entry for proceeding with the translation process. Assuming no sentence contains the noun phrase "fuel pressure test operations", the user is allowed to choose the sub-phrase "fuel pressure test" in field 62 for which the phrase index of the database 17 might have an entry.

Figure 7:
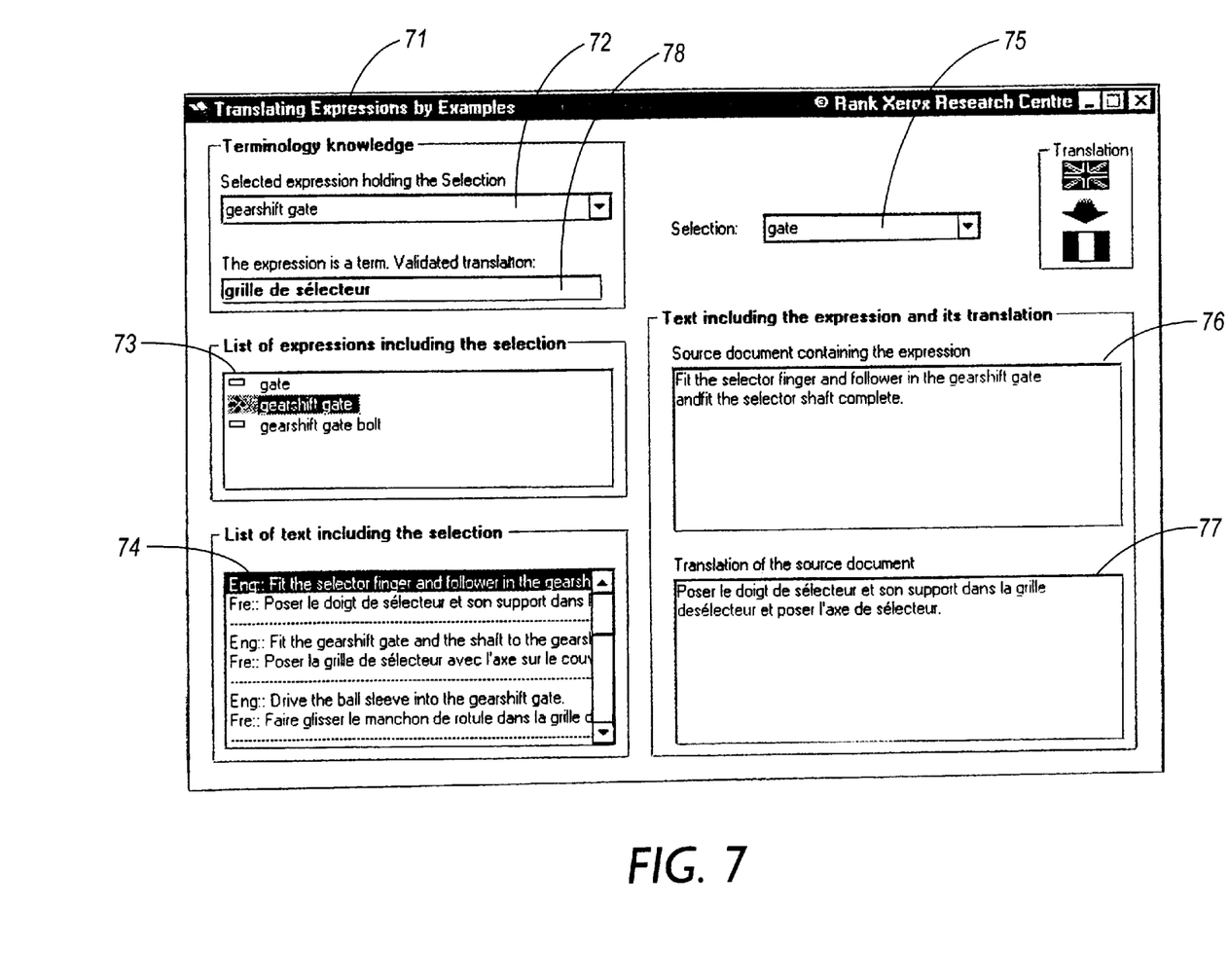
FIG. 7 illustrates a second embodiment of a user interface according to the invention.

The translation system according to the invention has been described as including a noun-phrase-indexed sentence database 17. In the preferred embodiment of FIG. 1, the system further includes a terminology base 16 to which the translation application running on control unit 14 has access. Once the user has selected, in step 35, a noun phrase to be translated, the system queries the terminology base in step 36. In case the terminology base does include a translation of the selected noun phrase, the system presents to the user in field 78 of FIG. 7 the retrieved translation. The user is then allowed to either approve the translation retrieved from the terminology base 16 and display it in field 78 or to approve the proposed translation retrieved from the phrase-indexed sentence database 17 and select it from the list displayed in field 74. For further assisting the user in deciding which translation to be used, the translation retrieved from the terminology base 16 is highlighted in the list of field 74 at each location where it appears.

As described from the foregoing, the present invention has many advantages in that it uses a noun-phrase-indexed sentence database in which noun phrases directly index whole sentences, leaving the recognition of the corresponding sub-units in the translated sentences to the user. Thus, no overall parse for translated sentences is performed. Nevertheless, the system according to the invention may be integrated among other conventional tools for translating expressions, such as example-based machine translation, contextual dictionary lookup, multi-lingual terminology databases, or translation memory. By providing a translation environment using phrase-indexed sentence databases and integrating existing technologies, any translator is provided with a powerful new translation aid.

While the invention has been described with respect to the preferred physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order not to unnecessarily obscure the invention described therein. It is for instance useless to say that the user can change the selected word at any time by typing in a new noun phrase or by selecting another element of the sub-phrase list.

Accordingly, it is to be understood that the invention is not to be limited by the specific illustrative embodiments, but only by the scope of the appended claims.

What is claimed is:

1. A method for translating a word phrase from a first natural language to a second natural language, said word phrase being a group of two or more associated words, the method comprising the steps of:

inputting a text written in the first language;

extracting said word phrase from said text;

querying a database for said extracted word phrase using a phrase index of said database; said phrase index indexing text fragments by word phrases; said text fragments representing a primary grammatical unit including at least one clause; the database containing pairs of text fragments, each pair including a text fragment of the first language and a corresponding text fragment of the second language; and obtaining a translation of said extracted word phrase based on one of the pairs of text fragments revealed during the step of querying the database.

2. The method of claim 1, wherein said word phrase is a noun phrase.

3. The method of claim 1, wherein said word phrase is a verb phrase.

4. The method of claim 1, wherein said word phrase is a predicate involving at least one verb and one noun or adjective used as a noun.

5. The method of claim 1, wherein the step of obtaining a translation includes the step of presenting to a user the revealed pairs of text fragments.

6. The method of claim 1, wherein the step of obtaining a translation includes the step of presenting to a user proposed translations of the extracted word phrase based on the revealed pairs of text fragments.

7. The method of claim 5, wherein the step of obtaining a translation further comprises the step of approving one of the revealed translations by the user and using the approved translation as translation of the extracted word phrase.

8. The method of claim 1, wherein said word phrase is extracted from a text fragment of said input text, and the step of obtaining a translation includes the step of sorting the revealed pairs of text fragments according to the number of word phrases common with said text fragment of said input text.

9. The method of claim 1, wherein the step of extracting a word phrase includes the step of selecting a word of said input text and determining the word phrase comprising said selected word.

10. The method of claim 1, wherein said primary grammatical units are sentences.

11. The method of claim 1, wherein the step of querying the database for the extracted phrase includes the step of querying the database for all word phrases partly matching the extracted phrase.

12. The method of claim 1, wherein the step of obtaining a translation includes querying a terminology base.

13. A computer-readable storage medium storing instructions for translating a word phrase from a first natural language to a second natural language by performing the steps of:

inputting a text written in the first language;

extracting said word phrase from said text, said word phrase being a group of two or more associated words;

querying a database for said extracted word phrase using a phrase index of said database; said phrase index indexing text fragments by word phrases; said text fragments representing a primary grammatical unit including at least one clause; the database containing pairs of text fragments, each pair including a text fragment of the first language and a corresponding text fragment of the second language; and obtaining a translation of said extracted word phrase based on one of the pairs of text fragments revealed during the step of querying the database.

14. A system for translating an input text from a natural source language to a natural target language, the system comprising:

storage means for storing a database containing a plurality of pairs of text fragments; said text fragments representing a primary grammatical unit including at least one clause; each pair including a text fragment in the source language and a corresponding text fragment in the target language, each text fragment containing at least one word phrase, said word phrase being a group of two or more associated words;

a phrase extractor for extracting a word phrase from a text fragment of said input text;

database retrieval means for retrieving, from said database, pairs of text fragments that contain the extracted word phrase, using a phrase index of said database, said phrase index indexing text fragments by word phrases; and user interface means for allowing a user to select one of said retrieved pairs of text fragments to obtain a translation of the extracted word phrase.

15. The system of claim 14, wherein said word phrase is a noun phrase.

16. The system of claim 14, wherein said word phrase is a verb phrase.

17. The system of claim 14, wherein said word phrase is a predicate involving at least one verb and one noun or adjective used as a noun.

18. The system of claim 14, wherein said user interface means is arranged for presenting to a user the retrieved pairs of text fragments.

19. The system of claim 14, wherein said user interface means is arranged for presenting to a user proposed translations of the determined word phrase into the target language based on the retrieved pairs of text fragments.

20. The system of claim 14, wherein said primary grammatical units are sentences.

21. The system of claim 14, wherein said database retrieval means is arranged for retrieving from the database pairs of text fragments containing word phrases partially matching the extracted word phrase.

22. The system of claim 14, further comprising a terminology base to which said database retrieval means has access.

23. A method for generating a text fragment database for use in translating a word phrase from a first natural language into a second natural language, said word phrase being a group of two or more associated words, the method comprising the steps of:

inputting a first document containing a text written in the first language;

inputting a second document containing said text written in the second language;

aligning corresponding text fragments of the first and second documents; said text fragments representing a primary grammatical unit including at least one clause;

extracting word phrases from the text fragments of the first document; and generating index information on the extracted word phrases and the aligned text fragments holding the word phrases, to generate a phrase index indexing text fragments by word phrases.

24. The method of claim 23, wherein said word phrases are noun phrases.

25. The method of claim 23, wherein said word phrases are verb phrases.

26. The method of claim 23, wherein said word phrases are predicates involving at least one verb and one noun or adjective used as a noun.

27. The method of claim 23, wherein said primary grammatical units are sentences.

28. The method of claim 23, wherein the steps of inputting, aligning and extracting are repeated for a plurality of paired documents.

29. The method of claim 23, wherein the contents of said plurality of paired documents are of the same field.

* * * * *